(12) United States Patent
Doubet et al.

(10) Patent No.: US 7,478,823 B2
(45) Date of Patent: Jan. 20, 2009

(54) DRAWBAR CLEVIS ASSEMBLY

(75) Inventors: Joseph Luther Doubet, Cedar Falls, IA (US); Bryan Kirk Buerkle, Waterloo, IA (US)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 11/328,008

(22) Filed: Jan. 9, 2006

(65) Prior Publication Data

US 2007/0176397 A1    Aug. 2, 2007

(51) Int. Cl.
*B60D 1/02* (2006.01)
*A01B 63/00* (2006.01)

(52) U.S. Cl. .................. 280/515; 280/504; 280/507; 280/514; 280/444; 280/452; 172/248; 172/677; 172/776; 172/679

(58) Field of Classification Search .......... 180/515, 180/504, 507, 514, 444, 452; 172/248, 677, 172/776, 679
See application file for complete search history.

(56) References Cited

U.S. PATENT DOCUMENTS

| | | | | |
|---|---|---|---|---|
| 2,654,613 A | * | 10/1953 | Blair et al. ................. | 280/515 |
| 3,843,160 A | * | 10/1974 | Frushour et al. ......... | 280/416.1 |
| 4,783,094 A | | 11/1988 | Sands ......................... | 280/515 |
| 4,799,706 A | | 1/1989 | Myers et al. ................ | 280/504 |
| 5,109,931 A | * | 5/1992 | Goll ........................... | 172/248 |
| 5,193,625 A | * | 3/1993 | Goll ........................... | 172/248 |
| 5,427,399 A | * | 6/1995 | Olson ......................... | 280/515 |
| 6,758,486 B1 | | 7/2004 | Kollath ...................... | 280/515 |

OTHER PUBLICATIONS

John Deere, Parts Catalog—4020 Tractor (Serial No. -200999), Oct. 1994, p. 70-76.
John Deere, Operator's Manual—7600, 7700, and 7800 Tractors, Jul. 1992, pp. 60-1 and 60-2.

* cited by examiner

*Primary Examiner*—Paul N Dickson
*Assistant Examiner*—Marlon A Arce Diaz

(57) ABSTRACT

A drawbar clevis assembly includes a drawbar with a greater offset between the upper inboard member and the lower outboard member. The clevis assembly also includes a strap which is mounted to the drawbar and which has an opening in a mid portion. The strap is slid over the drawbar so that the opening receives a portion of the drawbar and so that the inner portion of the strap is attached to an underside of the inboard portion of the drawbar.

6 Claims, 1 Drawing Sheet

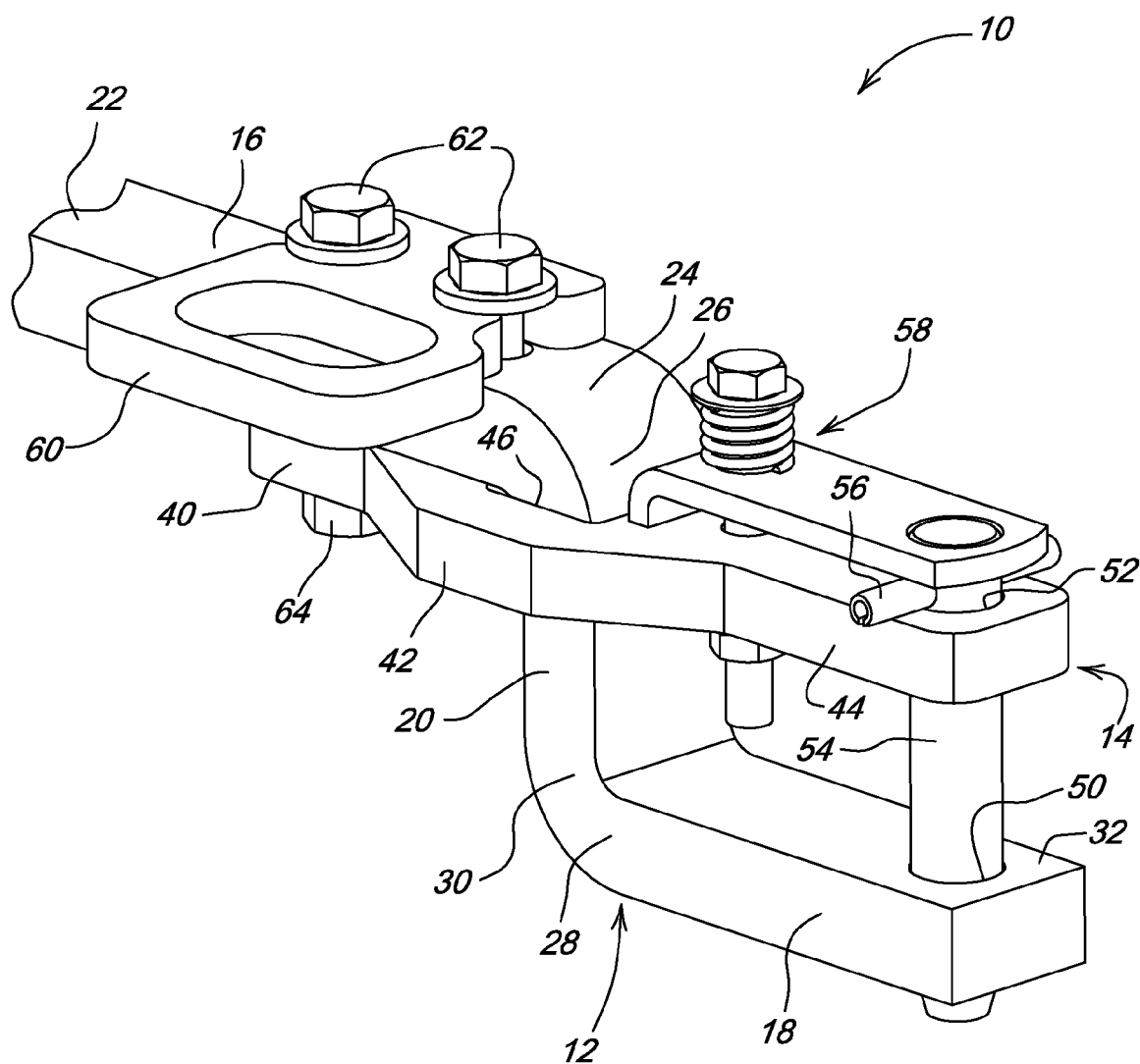

DRAWBAR CLEVIS ASSEMBLY

BACKGROUND

The present invention relates to a drawbar clevis assembly.

Typically, a tractor drawbar includes a clevis assembly. A towed implement can be coupled to the clevis with a drawbar pin which passes through the clevis and the implement drawbar. When certain implements, such as a baler or hay equipment, are coupled to certain current production tractor drawbars, the forward pitching of the tractor can cause the rear end of the implement to drag on the ground and pick up debris. This requires a drawbar with a larger offset, but the current drawbar strap ("hammerstrap") and hardware are not compatible with a drawbar with a larger offset.

SUMMARY

Accordingly, an object of this invention is to provide a drawbar clevis assembly which has a greater offset and which is compatible current drawbar pins and other current hardware.

This and other objects are achieved by the present invention, wherein a drawbar clevis assembly includes a drawbar with a greater offset between the upper inboard member and the lower outboard member. The clevis assembly also includes a strap which is mounted to the drawbar and which has an opening in a mid portion. The strap is slid over the drawbar so that the opening receives a portion of the drawbar and so that the inner portion of the strap is attached to an underside of the inboard portion of the drawbar.

BRIEF DESCRIPTION OF THE DRAWINGS

The sole FIGURE is a perspective view of a drawbar clevis assembly according to the present invention.

DETAILED DESCRIPTION

Referring to the FIGURE, a drawbar clevis assembly 10 includes a drawbar 12 and strap or "hammerstrap" 14. The drawbar 12 has an upper inboard member 16, a lower outboard member 18 and a vertically extending connecting portion 20. The inboard member 16 has an inner end 22 for coupling to a vehicle (not shown) and an outer end 24 joined to an upper end 26 of the connecting portion 20. The outboard member 18 has an inner end 28 joined to a lower end 30 of the connecting portion 20 and an outer end 32 for coupling to an implement (not shown). Preferably, the drawbar 12 is formed by bending a single structural piece. The vertical distance between the upper surface of member 16 and member 18 is the "offset".

The strap member 14 is mounted to the drawbar 12. The strap member 14 has an inner part 40, a mid part 42 and an outer part 44. The mid part 42 is preferably wider than the inner part 40 and the outer part 42. The mid part 42 has an opening 46 therein. The opening 46 receives the upper end of the connecting portion 20 of the drawbar 12, and the inner part 40 of the strap member 14 is attached to an underside of upper inboard member 16 of the drawbar 12. The outboard member 18 and the outer part 44 have aligned bores 50 and 52 for receiving a drawbar pin 54 which is insertable through the bores.

A conventional cross pin or handle 56 is mounted near an upper end of pin 54. A conventional spring-loaded latch device 58 is attached or bolted to the top surface of the strap member 14 for releasably retaining the drawbar pin in the bores 50 and 52. A conventional safety chain retainer 60 is attached by bolts 62 to the upper surface of inboard member 16. The bolts 62 extend through bores (not shown) in the inboard member 16 and the inner part 40 of strap member 14, and are secured by nuts 64, one of which is partially visible in the FIGURE.

With this clevis assembly the offset may be increased to 133.5 millimeters, which allows for use of all drawbar-mounted implements that comply with ASAE standards. The drawbar strap slides over the drawbar and mounts to the underside, thereby maintaining the necessary clevis gap per ASAE standards, and permitting use of current hardware and drawbar pin. The known current drawbar pin and other hardware can be used with the present invention as well as the previous known drawbar clevis assembly, so that an operator can use the same drawbar pin and other hardware with either drawbar clevis assembly. This reduces cost and part count while maintaining functionality.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the claims.

We claim:

1. A drawbar clevis assembly comprising:
   a drawbar having an upper inboard member, a lower outboard member and a connecting member, the inboard member having an inner end for coupling to a vehicle and an outer end joined to an upper end of the connecting member, and the outboard member having an inner end joined to a lower end of the connecting member and an outer end for coupling to an implement; and
   a strap mounted to the drawbar, the strap having an inner portion, a mid portion and an outer portion, the mid portion having an opening therein, said opening receiving the upper end of the connecting member of the drawbar, and the inner portion of the strap being attached to the inboard member of the drawbar, the outboard member and the outer portion having aligned bores for receiving a drawbar pin which is insertable through the bores, the opening being oriented vertically and the connecting member extending downwardly through the opening.

2. The drawbar clevis assembly of claim 1, further comprising: a latch member mounted to the strap member, the latch member releasably retaining the drawbar pin in the bores.

3. The drawbar clevis assembly of claim 1, wherein: at least a portion of the connecting member extending substantially vertically.

4. The drawbar clevis assembly of claim 1, wherein:
   the inner portion of the strap is attached to an underside of the inboard member of the drawbar.

5. A drawbar clevis assembly comprising:
   a drawbar having inner end for coupling to a vehicle, an outer end for coupling to an implement and a connecting member extending substantially vertically between the inner end and the outer end; and
   a strap mounted to the drawbar, the strap having an outer portion for coupling to the implement, a mid portion and an inner portion, the mid portion having an opening therein, said opening being oriented vertically and receiving an upper end of the connecting member of the drawbar, and the inner portion of the strap being attached to an underside of the inner end of the drawbar, the outer end and the outer portion having aligned bores for receiving a drawbar pin which is insertable through the bores, and all portions of the strap are lower than the inner end of the drawbar.

6. A drawbar clevis assembly comprising:

a drawbar having an upper inboard member, a lower outboard member and a connecting member, the inboard member having an inner end for coupling to a vehicle and an outer end joined to an upper end of the connecting member, and the outboard member having an inner end joined to a lower end of the connecting member and an outer end for coupling to an implement; and a strap mounted to the drawbar, all portions of the strap being lower than the upper inboard member, the strap having a single opening therein, said opening receiving the upper end of the connecting member of the drawbar, and the strap being attached to the inboard member of the drawbar, the outboard member and the strap having aligned bores for receiving a drawbar pin which is insertable through the bores, the opening being oriented vertically and the connecting member extending downwardly through the opening.

* * * * *